United States Patent [19]

Ogata

[11] Patent Number: 5,216,547
[45] Date of Patent: Jun. 1, 1993

[54] SMALL THREE-UNIT VARIABLE FOCAL LENGTH LENS SYSTEM

[75] Inventor: Yasuzi Ogata, Akikawa, Japan

[73] Assignee: Olympus Optical Co., Ltd., Tokyo, Japan

[21] Appl. No.: 734,282

[22] Filed: Jul. 8, 1991

[30] Foreign Application Priority Data

Jul. 18, 1990 [JP] Japan .................. 2-190170

[51] Int. Cl.$^5$ .................. G02B 15/16; G02B 13/18
[52] U.S. Cl. .................. 359/689; 359/708; 359/713
[58] Field of Search .................. 359/689, 708, 713

[56] References Cited

U.S. PATENT DOCUMENTS 4,726,668 2/1988 Nakayama et al. .................. 359/791
4,773,744 9/1988 Yamanashi .................. 359/689

FOREIGN PATENT DOCUMENTS 62-78522 4/1987 Japan .
1-93713 4/1989 Japan .
2-50117 2/1990 Japan .

Primary Examiner—Scott J. Sugarman
Attorney, Agent, or Firm—John K. Corbin

[57] ABSTRACT

A variable focal length lens system having, in the order from the object side, a first positive lens unit, a second positive lens unit and a third negative lens unit. In order to vary the focal length from the wide position to the tele position, the first positive lens unit and the third negative lens unit are moved jointly or independently toward the object side while the second positive lens unit is moved toward the object side at a lower speed than the first and third lens units. The variable focal length lens system satisfies the following conditions:

$$0.5 < |f_3/f_W| < 0.9 \quad (1)$$

$$1.3 < \beta_{3W} < 2.0 \quad (2)$$

$$0.5 < f_2/f_W < 1.3 \quad (3)$$

where $f_W$ is the focal length of the entire system at the wide position, $f_2$ and $f_3$ are the focal lengths of the second and third lens units, respectively, and $\beta_{3W}$ is the image magnification of the third lens unit at the wide position.

19 Claims, 20 Drawing Sheets

Wide Position

Tele Position

FIG. 2
Wide Position
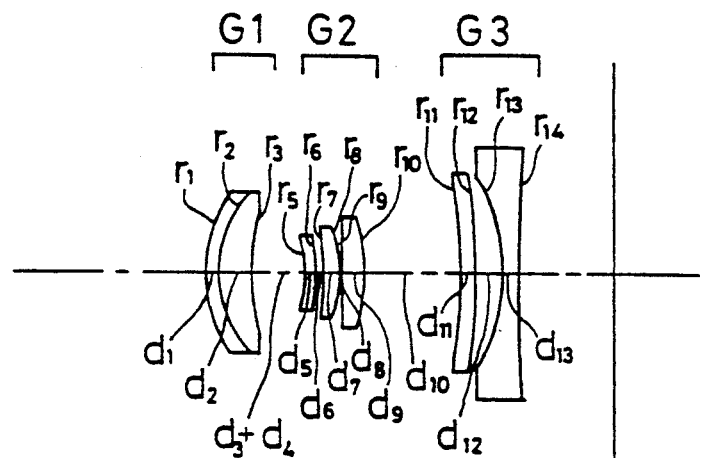
Tele Position
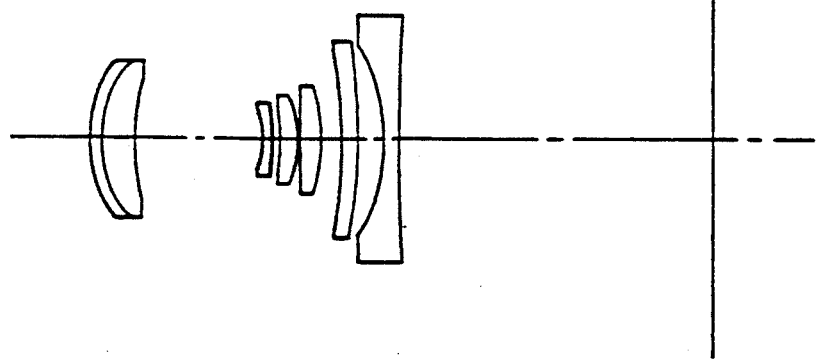

SMALL THREE-UNIT VARIABLE FOCAL LENGTH LENS SYSTEM

BACKGROUND OF THE INVENTION

1. Field of the Invention

This invention relates to a small variable focal length lens system with a small length which is adapted for a lens shutter camera and the like.

2. Description of the Related Art

Recently variable focal length lenses have been widely used as the taking lenses of lens shutter cameras, and consequently smaller variable focal length lenses have been demanded.

Conventional variable focal length lenses used for lens shutter cameras which have a zooming ratio of about 2 are mostly two-unit zoom lenses comprising first lens units of positive refractive power and second lens units of negative refractive power. In this type of zoom lens, however, the tele ratio at the wide position is at most about 1.3 and the amount of shift of the respective units at the time of zooming is large, thus the total length of the lens system is large and it is difficult to reduce the thickness of the camera. Furthermore, while the total length of the two-unit zoom lens can be reduced by increasing the refractive power of the respective units, then the variation of aberrations due to zooming is large and difficult to correct well.

On the other hand, the three-unit zoom lens comprising a first lens unit of positive refractive power, a second lens unit of positive refractive power and a third lens unit of negative refractive power can be made small with aberrations well maintained by setting the power of the respective units properly. Examples of prior art using this type of three-unit zoom are as follows: as examples of a zooming ratio of about 1.5, Japanese Laid-Open Paten Applications, Publication Nos. Sho 60-263113 and Sho 62-78522; and as examples of a zooming ratio of about 2, Japanese Laid-Open Patent Applications, Publication Nos. Hei 1-93713 and Hei 2-50117.

However, each of these conventional zoom lenses has a tele ratio o about 1.3 at the wide position and is as large as a two-unit zoom lens. The zoom lenses disclosed in Japanese Laid-Open Patent Applications, Publication Nos. Sho 62-78522, Hei 1-93713 and Hei 2-50117 comprise a large number of lens components and are disadvantageous in terms of manufacturing costs. While the zoom lens disclosed in japanese Laid-Open Patent Application, Publication No. Sho 60-263113 comprises a small number of lens components, its zooming ratio is small, i.e., 1.5 and the level of correction of aberrations is not satisfactory for practical use. Similarly, the level of correction of aberrations in Japanese Laid-Open Patent Application, Publication No. Hei 1-93713 is not satisfactory.

SUMMARY OF THE INVENTION

An object of the present invention is to provide a small variable focal length lens system with a short length.

Another object of the present invention is to provide a variable focal length lens system having a tele ratio of 1.2 or less at the wide position.

A further object of the present invention is to provide a small variable focal length lens system in which the variation of aberrations due to zooming is small.

A variable focal length lens system according to the present invention comprises, in the order from the object side, a first positive lens unit, a second positive lens unit and a third negative lens unit, the focal length being variable from the wide position to the tele position by moving the first positive lens unit and the third negative lens unit toward the object side while moving the second positive lens unit toward the object side at a lower speed than the first and third lens units, the lens system satisfying the following conditions:

$$0.5 < |f_3/f_W| < 0.9 \quad (1)$$

$$1.3 < \beta_{3W} < 2.0 \quad (2)$$

$$0.5 < f_2/f_W < 1.3 \quad (3)$$

where $f_W$ is the focal length of the entire system at the wide position, $f_2$ and $f_3$ are the focal lengths of the second and third lens units, respectively, and $\beta_{3W}$ is the image magnification of the third lens unit at the wide position.

The first and third lens units may be moved jointly or independently toward the object side.

In the variable focal length lens system of the present invention, since the first and second lens units G1 and G2 come nearest to each other at the wide position, these lens units and the third lens unit G3 form a so-called telephoto type of lens. Therefore, the total length of the lens system can be reduced by increasing the composite power of the first and second lens units G1 and G2 and the power of the third lens unit G3, and the conditions for these purposes are defined by formulae (1) and (2).

If the power of the third lens unit G3 exceeds the upper limit of formula (1) to become weaker, the effect of the telephoto type becomes weak and the total length of the lens system becomes too large and is difficult to shorten. If the power of the third lens unit G3 is below the lower limit, while it is favorable for reducing the total length of the lens system, the power of the third lens unit G3 is too strong and it is difficult to correct the variation of aberrations, especially distortion.

While formula (2) is the condition concerning the image magnification of the third lens unit, formula (2) also defines the composite power of the first and second lens units G1 and G2 since $$f_W = f_{12W} \beta_{3W}$$

where $f_{12W}$ is the composite focal length of the first and second lens units G1 and G2 at the wide position. If the reduction of the total length of the lens system is the only thing to be considered, it can be easily achieved by bringing the back focus close to zero. Then, however, the third lens unit G3 comes too close to the image plane and the diameter of the third lens unit G3 must be large, which is not desirable for reducing the size of the camera body. Therefore, the reduction of the total length of the lens system can contribute to a compact camera body only if a sufficient back focus is reserved. When the back focus at the wide position is represented by $f_{BW}$, there is the relation:

$$f_{BW} = f_3(1 \beta_{3W})$$

and the back focus $f_{BW}$ is determined by the focal length and image magnification of the third lens unit G3. If the back focus is large, the diameter of the third lens unit G3 can be small. However, since the value $f_3$ is defined by formula (1), it is effective to increase the value $\Theta_{3W}$ in order to lengthen the back focus. If the magnification exceeds the upper limit of formula (2) to become larger, it is advantageous to the total length of the lens system and the back focus. However, the composite power of the first and second lens units G1 and G2 is too strong and the variation of aberrations is difficult to correct. If the magnification is below the lower limit, the object for reducing the size cannot be achieved.

Next, even though the reduction of size at the wide position can be attained by formulae (1) and (2), the thickness of the camera body cannot be reduced if the amount of movement due to zooming is large. Therefore, in order to reduce the size, it is also necessary to reduce the amount of movement of the lens units and the condition for that purpose is expressed by formula (3).

If the upper limit of formula (3) is exceeded, the amount of movement of the lens units becomes large and it is not desirable for the reduction of size. If the lower limit is transgressed, the power of the second lens unit G2 becomes strong, thus it is advantageous to the reduction of size, but the variation of aberrations is difficult to correct.

Although satisfying formulae (1) to (3) enables the lens system to be small, it is further preferable that the respective lens units have the following lens composition in order to maintain the length of each lens unit as short as possible and minimize the number of lens components to correct the aberrations well. The first lens unit G1 comprises, in the order from the object side, a negative meniscus lens with its convex surface on the object side, and a positive meniscus lens with its convex surface on the object side. The second lens unit G2 comprises, in the order from the object side, a negative lens, a positive lens, and a positive lens. The third lens unit comprises at least one negative lens. Each of the second and third lens units G2 and G3 has at least one aspheric surface. The aspheric surface of the second lens unit G2 has a shape in which positive power gradually decreases or negative power gradually increases as the distance from the optical axis becomes larger. The aspheric surface of the third lens unit G3 has a shape in which positive power gradually increases or negative power gradually decreases as the distance from the optical axis becomes larger. The negative and positive lenses of the second lens unit G2 may be cemented or separated as occasion demands.

In the above lens composition, it is preferable to satisfy the following condition:

$$n_{2P}^* < 1.65 \quad (4)$$

where $n_{2P}^*$ is the mean value of the refractive indices of the positive lens components of the second lens unit G2 with respect to the d-line. If the upper limit of formula (4) is exceeded, distortion is overcorrected and difficult to correct especially on the wide side.

BRIEF DESCRIPTION OF THE DRAWINGS

FIGS. 1 to 5 are sectional views of variable focal length lens systems according to Embodiments 1 to 5 of the present invention, respectively;

DETAILED DESCRIPTION OF THE PREFERRED EMBODIMENTS

Embodiments of the present invention will be described below. In each embodiment, the first lens unit G1 comprises two lens components: a negative meniscus lens with its convex surface on the object side and a positive meniscus lens with its convex surface on the object side; and the second lens unit G2 comprises three lens components: a negative meniscus lens with its convex surface on the image side, a positive meniscus lens with its convex surface on the image side, and a positive lens. In Embodiment 1, the third lens unit G3 comprises two lens components: a positive plastic meniscus lens and a negative biconcave lens. In Embodiments 2 and 5, the third lens unit G3 comprises two lens components: a negative meniscus lens and a negative biconcave lens. In Embodiments 3 and 4, the third lens unit G3 comprises a negative lens. The two lens components of the first lens unit G1 are cemented in Embodiments 1 and 2 and separated in Embodiments 3 to 5.

In the following embodiments, when the z axis is in the direction of the optical axis and the y axis is in a direction perpendicular to the optical axis, the shape of the aspheric surface is expressed by $$z = y^2 / [R - (R^2 - y^2)^{\frac{1}{2}}] + A_4 y^4 + A_6 y^6 + A_8 y^8$$

where R is the radius of curvature of the reference sphere and $A_4$, $A_6$ and $A_8$ are aspheric coefficients.

Other symbols used represent the following meanings: f is the focal length of the lens system; $F_{NO}$ is the f-number; $2\omega$ is the field angle; $f_B$ is the back focus; $r_1$, $r_2$, ... are the radii of curvature of respective lens surfaces; $d_1$, $d_2$, ... are the distances between respective lens surfaces; $n_{d1}$, $n_{d2}$, ... are the refractive indices of respective lenses with respect to the d-line; and $\nu_{d1}$, $\nu_{d2}$, ... are the Abbe numbers of respective lenses.

EMBODIMENT 1

```
f = 36.22 - 49.46 - 67.55
F_NO = 4.7 - 5.8 - 7.3
2ω = 61.6° - 47.2° - 35.5°
f_B = 10.52 - 20.17 - 33.01
d_3  3.773 - 7.585 - 10.719
d_10 = 8.347 - 4.536 - 1.401
r_1 = 12.9480
```

-continued

| | $d_1 = 1.2000$ | $n_{d1} = 1.80518$ | $\nu_{d1} = 25.43$ |
|---|---|---|---|
| $r_2 = 10.4800$ | $d_2 = 3.5000$ | $n_{d2} = 1.48749$ | $\nu_{d2} = 70.20$ |
| $r_3 = 27.4420$ | $d_3 = $ (variable) | | |
| $r_4 = \infty$ (stop) | $d_4 = 2.1000$ | | |
| $r_5 = -8.5120$ | $d_5 = 1.0000$ | $n_{d3} = 1.80610$ | $\nu_{d3} = 40.95$ |
| $r_6 = -13.1680$ | $d_6 = 1.0200$ | | |
| $r_7 = -30.6130$ | $d_7 = 1.7000$ | $n_{d4} = 1.51602$ | $\nu_{d4} = 56.80$ |
| $r_8 = -11.8830$ | $d_8 = 0.2000$ | | |
| $r_9 = -298.5420$ | $d_9 = 2.0800$ | $n_{d5} = 1.56873$ | $\nu_{d5} = 63.16$ |
| $r_{10} = -16.3890$ (aspheric) | $d_{10} = $ (variable) | | |
| $r_{11} = -24.5430$ | $d_{11} = 2.4000$ | $n_{d6} = 1.50050$ | $\nu_{d6} = 56.68$ |
| $r_{12} = -19.8510$ (aspheric) | $d_{12} = 1.9800$ | | |
| $r_{13} = -12.2670$ | $d_{13} = 1.7000$ | $n_{d7} = 1.60300$ | $\nu_{d7} = 65.48$ |
| $r_{14} = 622.8200$ | | | |

Aspheric Coefficients

Figure 1:
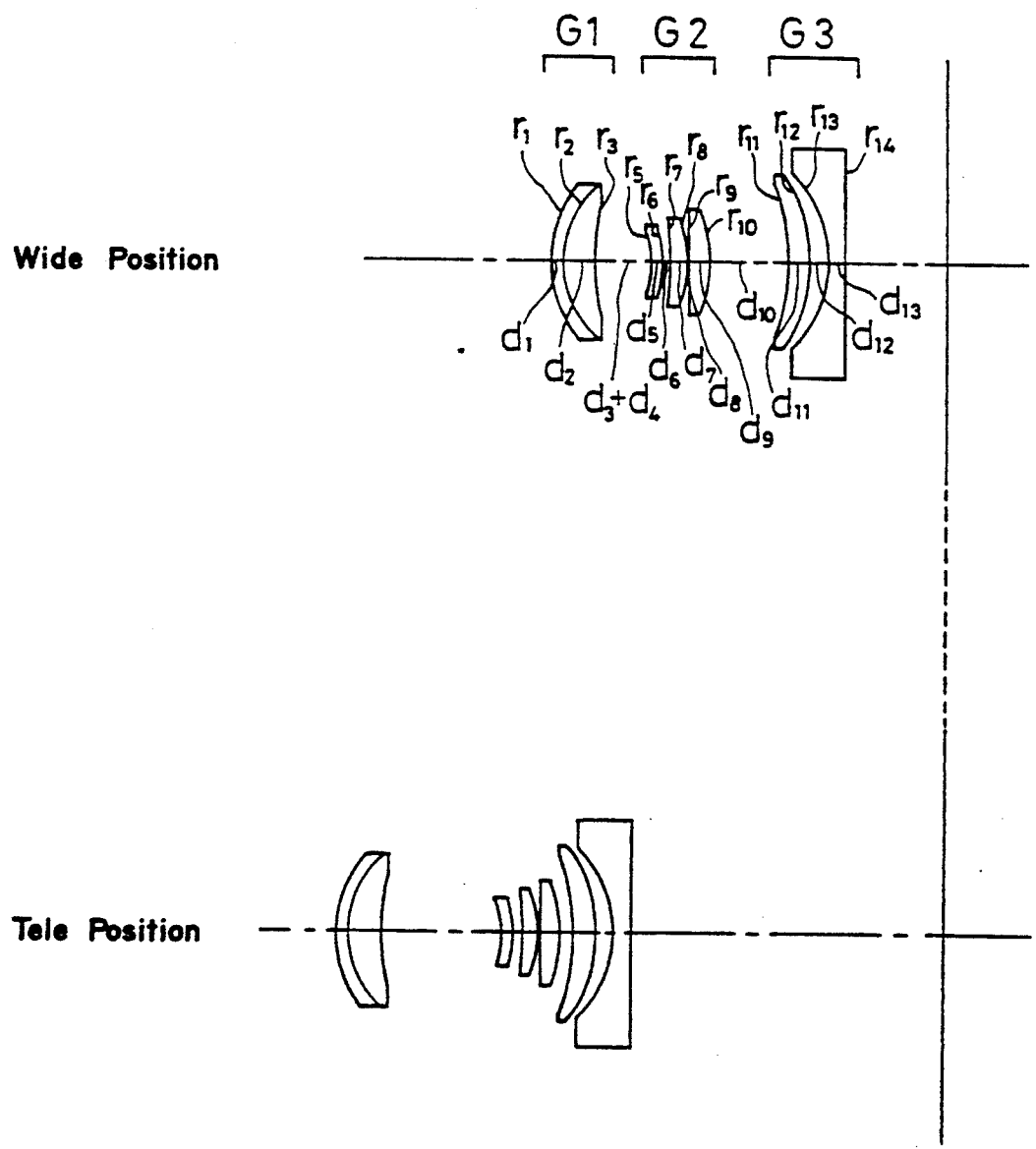
Figure 6:
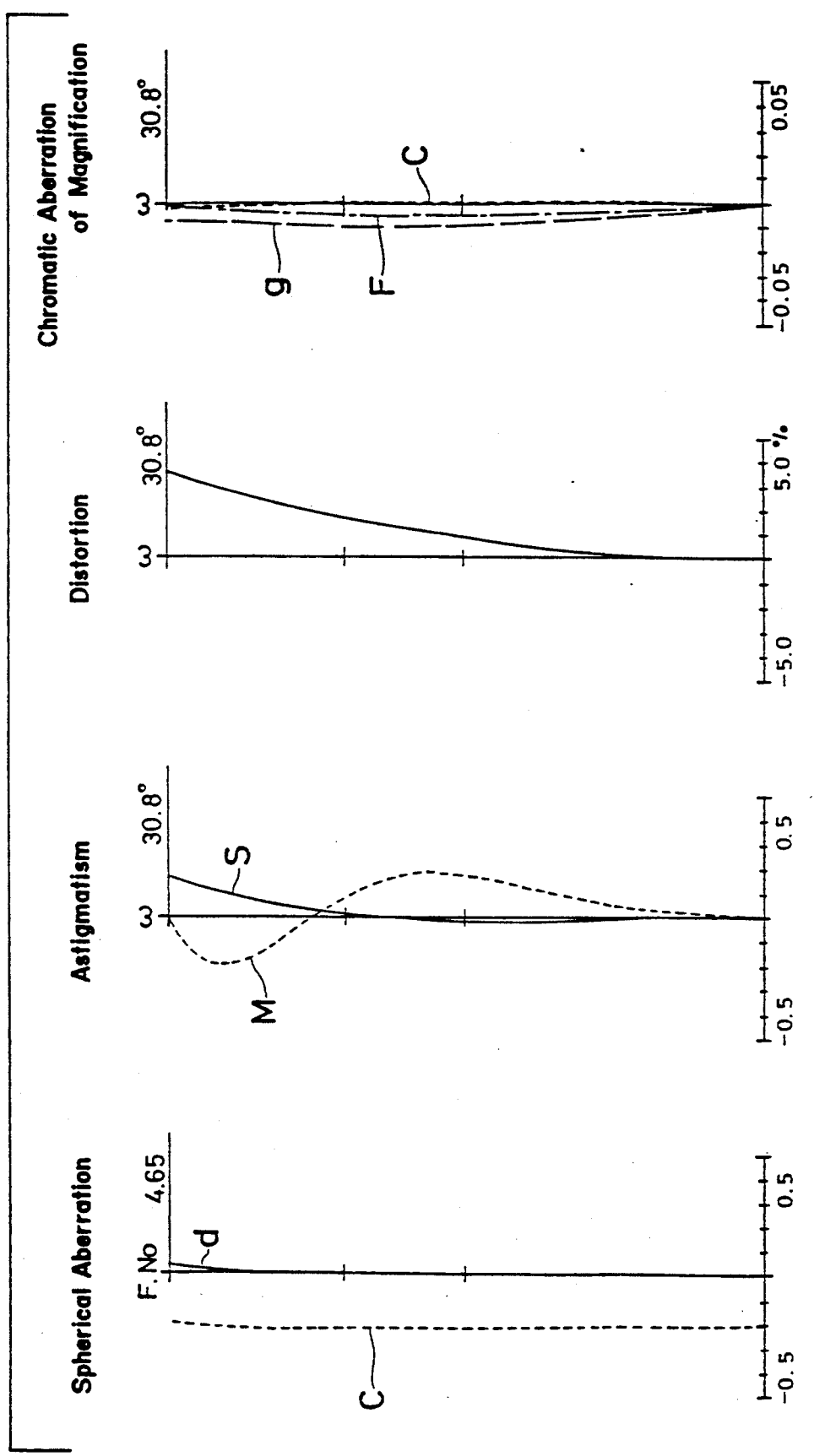
FIGS. 6 to 8 are curves illustrating aberration characteristics at the wide, standard and tele positions of Embodiment 1, respectively.
Figure 7:
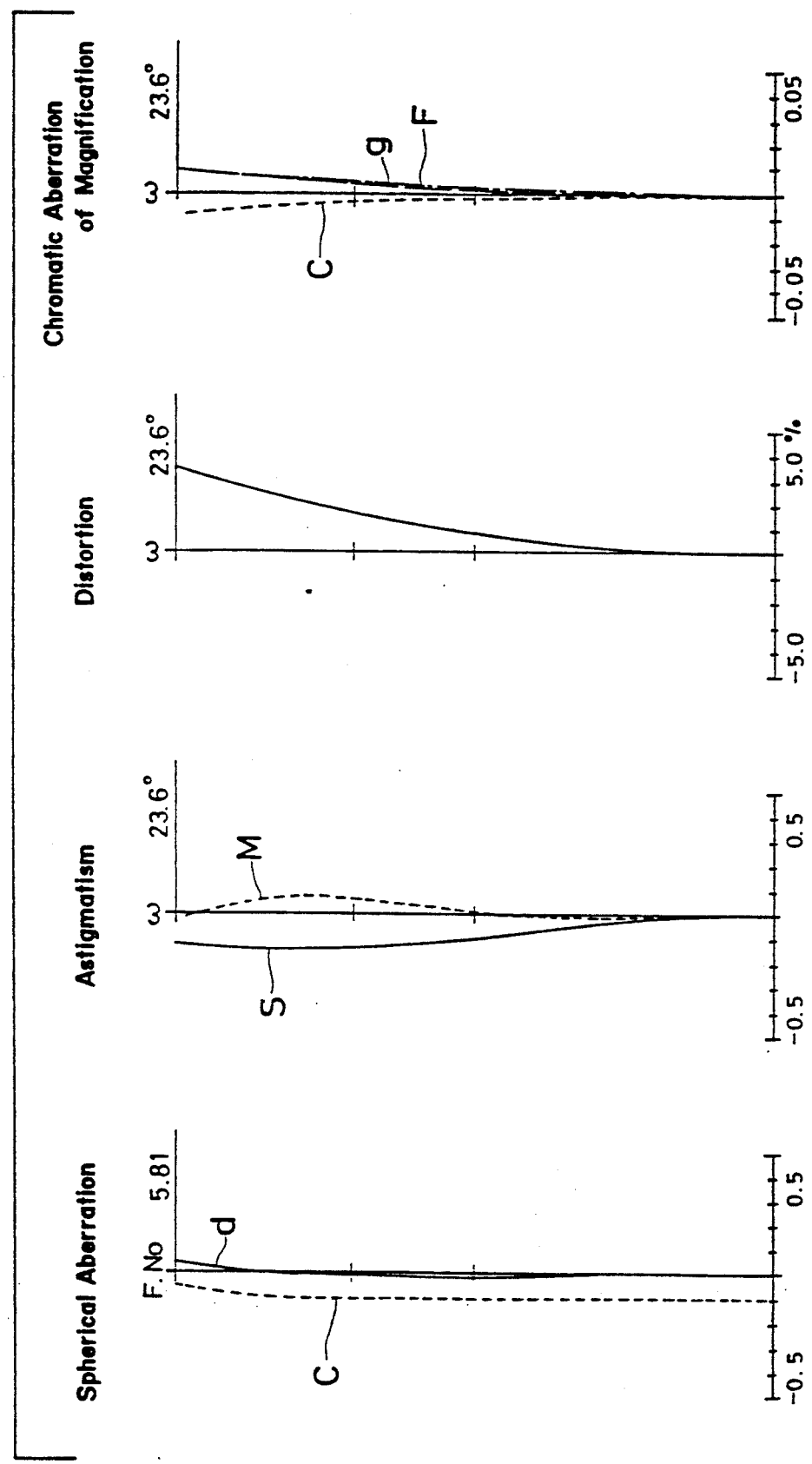
Figure 8:
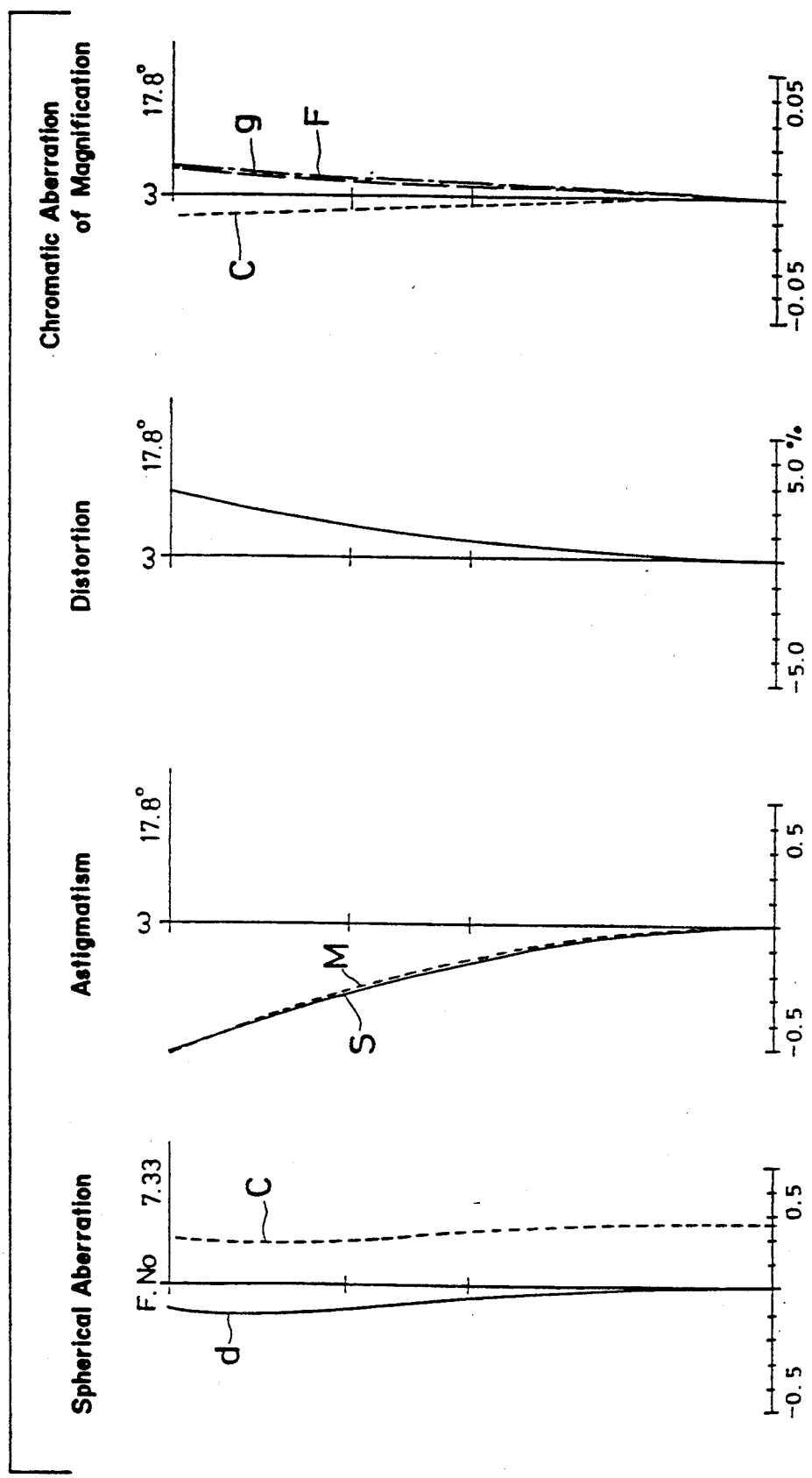

The 10th Surface
$A_4 = 0.73408 \times 10^{-4}$, $A_6 = -0.59855 \times 10^{-6}$,
$A_8 = 0.10290 \times 10^{-7}$
The 12th Surface
$A_4 = -0.98303 \times 10^{-4}$,
$A_6 = 0.98303 \times 10^{-7}$,
$A_8 = -0.42943 \times 10^{-8}$ $n_{2P}^* = 1.54$ The sectional views of the variable focal length lens system of Embodiment 1 at the wide and tele positions are shown in FIG. 1 and its aberration curves at the wide, standard and tele positions are shown in FIGS. 6 to 8.

EMBODIMENT 2

| $f = 36.22 - 49.46 - 67.55$ | | | |
|---|---|---|---|
| $F_{NO} = 4.7 - 5.8 - 7.3$ | | | |
| $2\omega = 61.6° - 47.2° - 35.5°$ | | | |
| $f_B = 9.83 - 19.63 - 32.64$ | | | |
| $d_3 = 3.476 - 7.724 - 11.235$ | | | |
| $d_{10} = 9.904 - 5.656 - 2.145$ | | | |
| $r_1 = 13.5450$ | | | |
| | $d_1 = 1.2000$ | $n_{d1} = 1.80518$ | $\nu_{d1} = 25.43$ |
| $r_2 = 10.9190$ | $d_2 = 3.6200$ | $n_{d2} = 1.48749$ | $\nu_{d2} = 70.20$ |
| $r_3 = 29.0110$ | $d_3 = $ (variable) | | |
| $r_4 = \infty$ (stop) | $d_4 = 2.1000$ | | |
| $r_5 = -8.8610$ | $d_5 = 1.0000$ | $n_{d3} = 1.78590$ | $\nu_{d3} = 44.18$ |
| $r_6 = -16.9770$ | $d_6 = 0.8000$ | | |
| $r_7 = -28.6750$ | $d_7 = 1.8000$ | $n_{d4} = 1.51823$ | $\nu_{d4} = 58.96$ |
| $r_8 = -11.2680$ | $d_8 = 0.2000$ | | |
| $r_9 = \infty$ | $d_9 = 2.3000$ | $n_{d5} = 1.58913$ | $\nu_{d5} = 60.97$ |
| $r_{10} = -16.0070$ (aspheric) | $d_{10} = $ (variable) | | |
| $r_{11} = -49.7940$ | $d_{11} = 1.4000$ | $n_{d6} = 1.62041$ | $\nu_{d6} = 60.27$ |
| $r_{12} = -70.7590$ | $d_{12} = 3.0000$ | | |
| $r_{13} = -16.1610$ (aspheric) | $d_{13} = 1.7000$ | $n_{d7} = 1.56873$ | $\nu_{d7} = 63.16$ |
| $r_{14} = 221.3170$ | | | |

$|f_3/f_W| = 0.61$ $\beta_{3W} = 1.55$ $f_2/f_W = 0.72$

Figure 9:
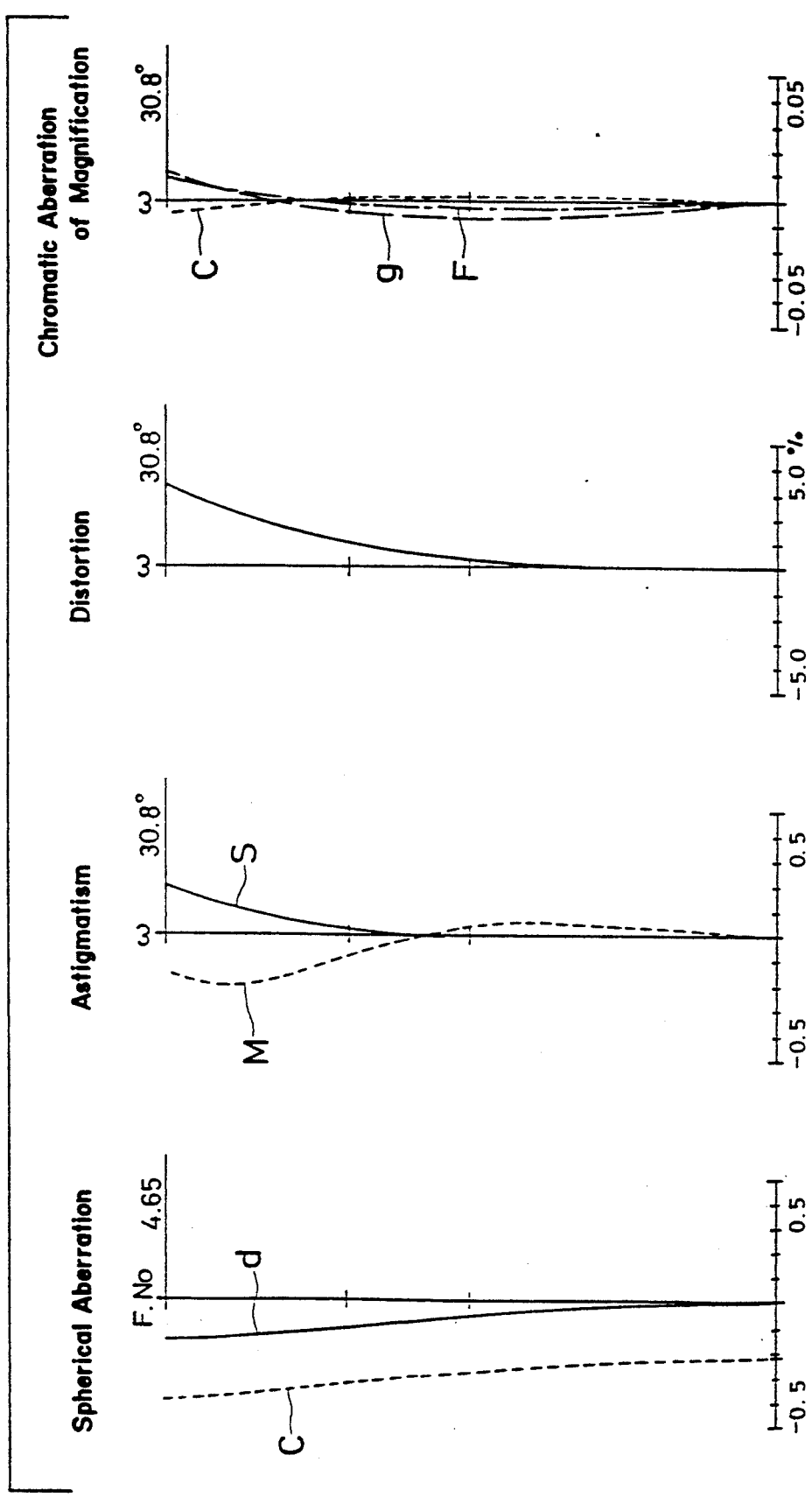
FIGS. 9 to 11 are curves illustrating aberration characteristics at the wide, standard and tele positions of Embodiment 2, respectively.
Figure 10:
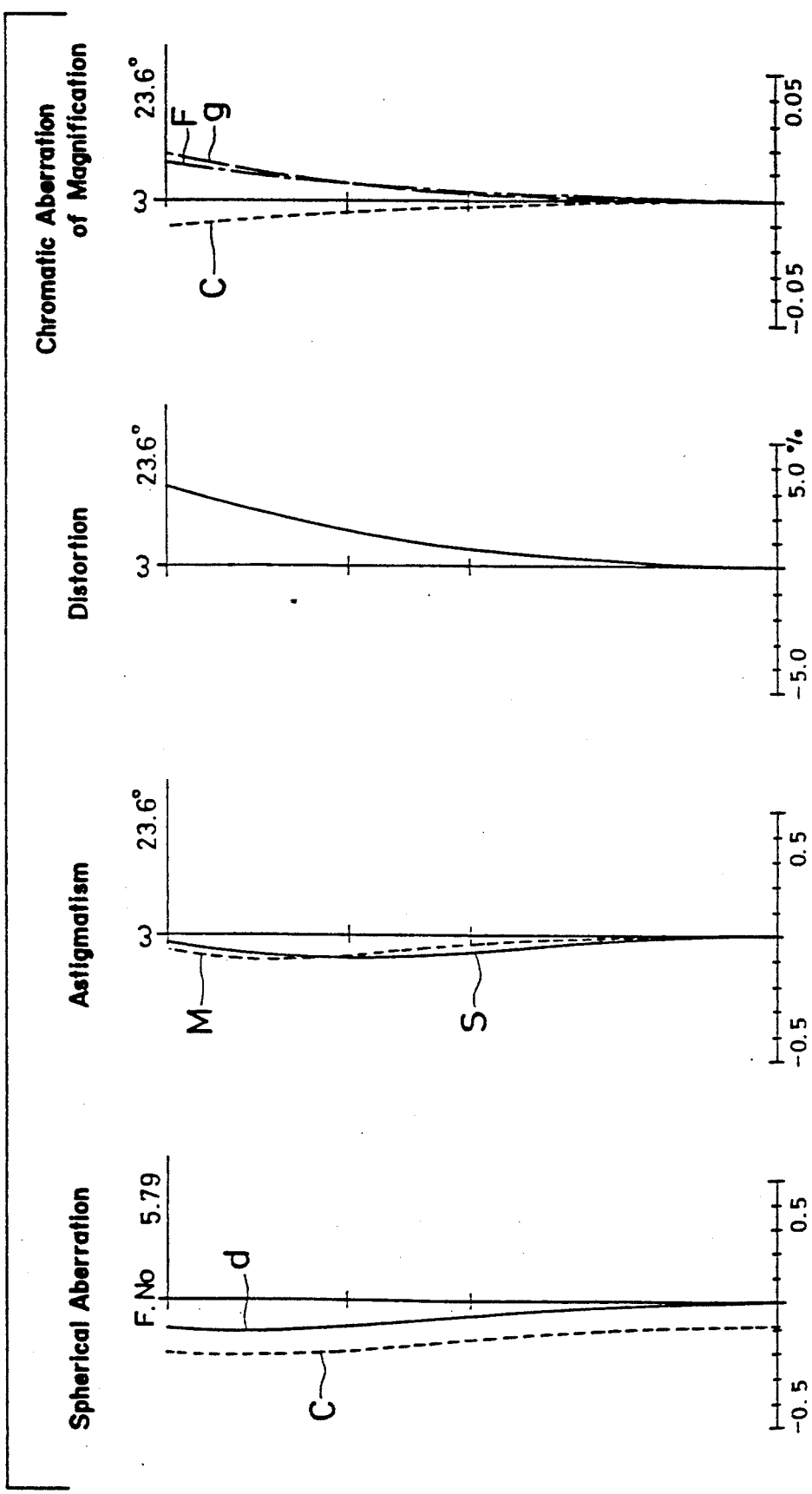
Figure 11:
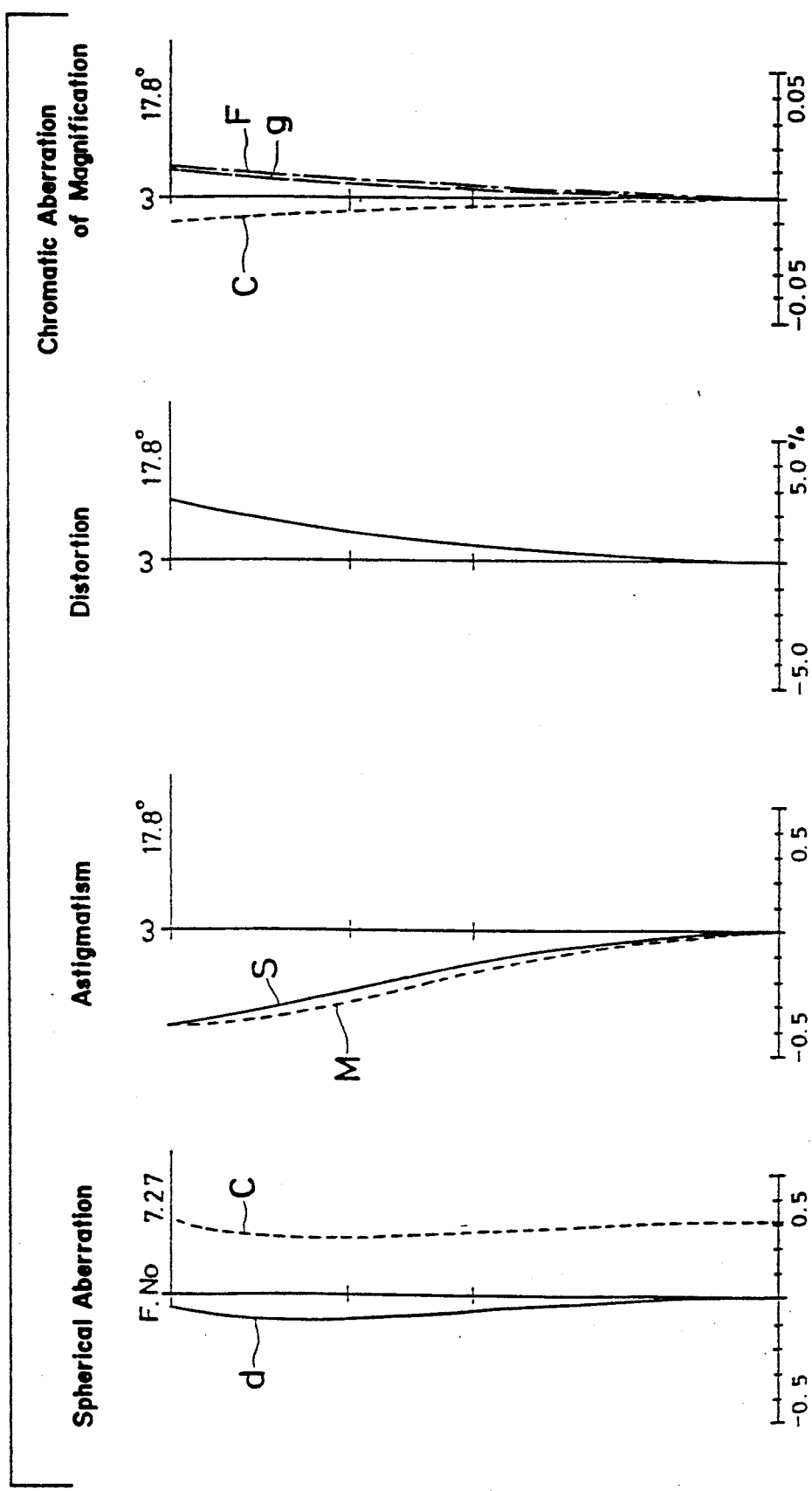

Asperic Coefficients
The 10th Surface
$A_4 = 0.55274 \times 10^{-4}$,
$A_6 = -0.11449 \times 10^{-6}$, $A_8 = 0.36893 \times 10^{-8}$
The 13th Surface
$A_4 = 0.52742 \times 10^{-4}$,
$A_6 = 0.48466 \times 10^{-7}$,
$A_8 = 0.13957 \times 10^{-9}$ $|f_3/f_W| = 0.65$ $\beta_{3W} = 1.48$ $f_2/f_W = 0.76$ $n_{2P}{}^* = 1.55$ The sectional views of the variable focal length lens system of Embodiment 2 at the wide and tele positions are shown in FIG. 2 and its aberration curves at the wide, standard and tele positions are shown in FIGS. 9 to 11.

EMBODIMENT 3

```
f  = 36.22 - 49.46 - 67.55
F_NO = 4.7 - 5.8 - 7.2
2ω = 61.6° - 47.2° - 35.5°
f_B = 9.87 - 19.40 - 32.02
d_4 = 3.474 - 7.767 - 11.330
d_11 = 13.426 - 9.133 - 5.570
```

| | | | |
|---|---|---|---|
| $r_1 = 13.4380$ | | | |
| | $d_1 = 1.2000$ | $n_{d1} = 1.80518$ | $\nu_{d1} = 25.43$ |
| $r_2 = 10.7890$ | | | |
| | $d_2 = 0.5000$ | | |
| $r_3 = 10.8170$ | | | |
| | $d_3 = 3.6200$ | $n_{d2} = 1.48749$ | $\nu_{d2} = 70.20$ |
| $r_4 = 29.7510$ | | | |
| | $d_4 = $ (variable) | | |
| $r_5 = \infty$ (stop) | | | |
| | $d_5 = 2.1000$ | | |
| $r_6 = -8.3810$ | | | |
| | $d_6 = 1.0000$ | $n_{d3} = 1.83400$ | $\nu_{d3} = 37.16$ |
| $r_7 = -13.7200$ | | | |
| | $d_7 = 0.6800$ | | |
| $r_8 = -30.8720$ | | | |
| | $d_8 = 1.8000$ | $n_{d4} = 1.51118$ | $\nu_{d4} = 51.02$ |
| $r_9 = -11.1460$ | | | |
| | $d_9 = 0.2000$ | | |
| $r_{10} = -88.0740$ | | | |
| | $d_{10} = 2.3000$ | $n_{d5} = 1.51823$ | $\nu d5 = 58.96$ |
| $r_{11} = -14.0840$ (aspheric) | | | |
| | $d_{11} = $ (variable) | | |
| $r_{12} = -14.1910$ (aspheric) | | | |
| | $d_{12} = 1.7000$ | $n_{d6} = 1.56873$ | $\nu_{d6} = 63.16$ |
| $r_{13} = 209.2770$ | | | |

Figure 3:
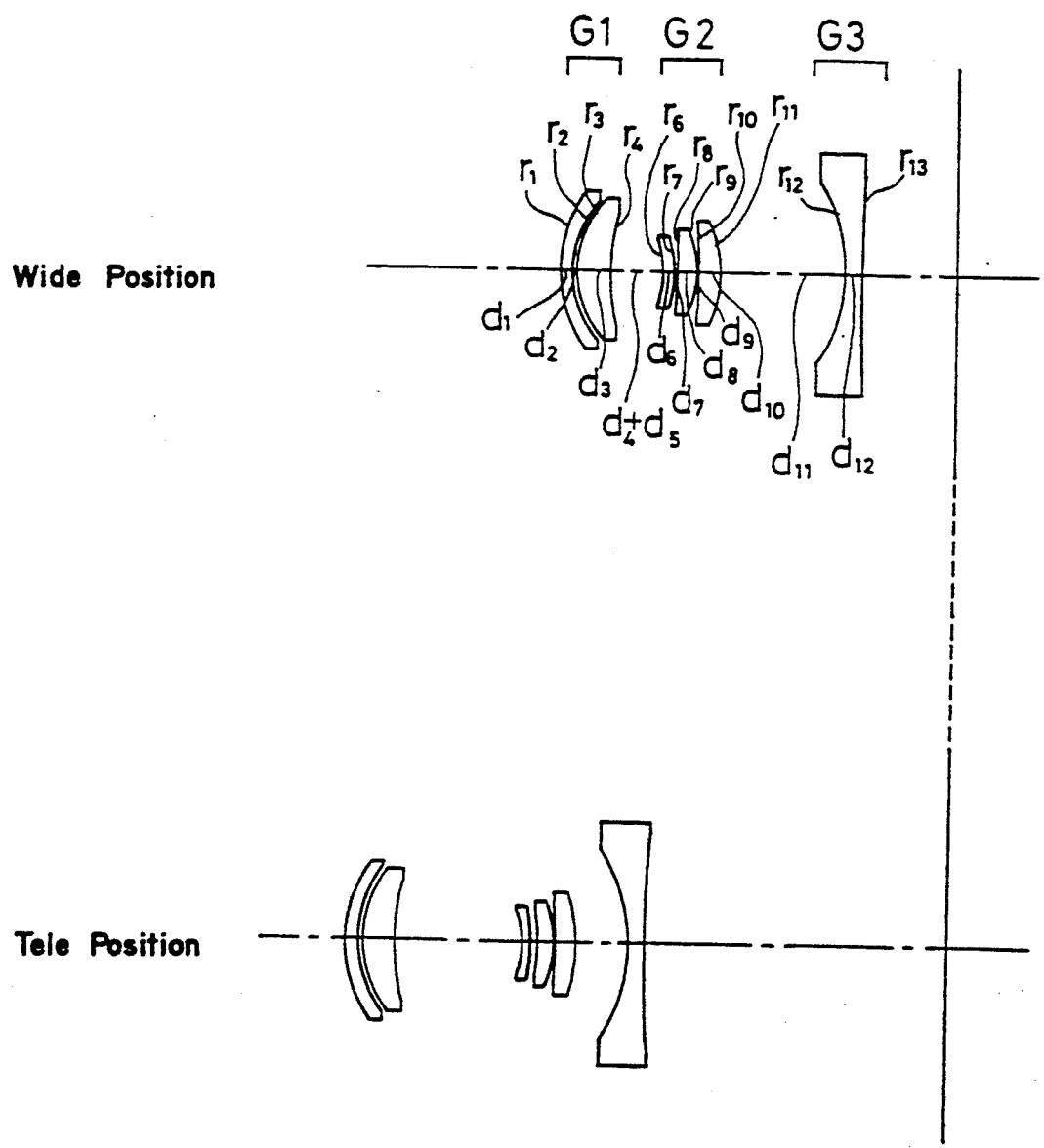
Figure 12:
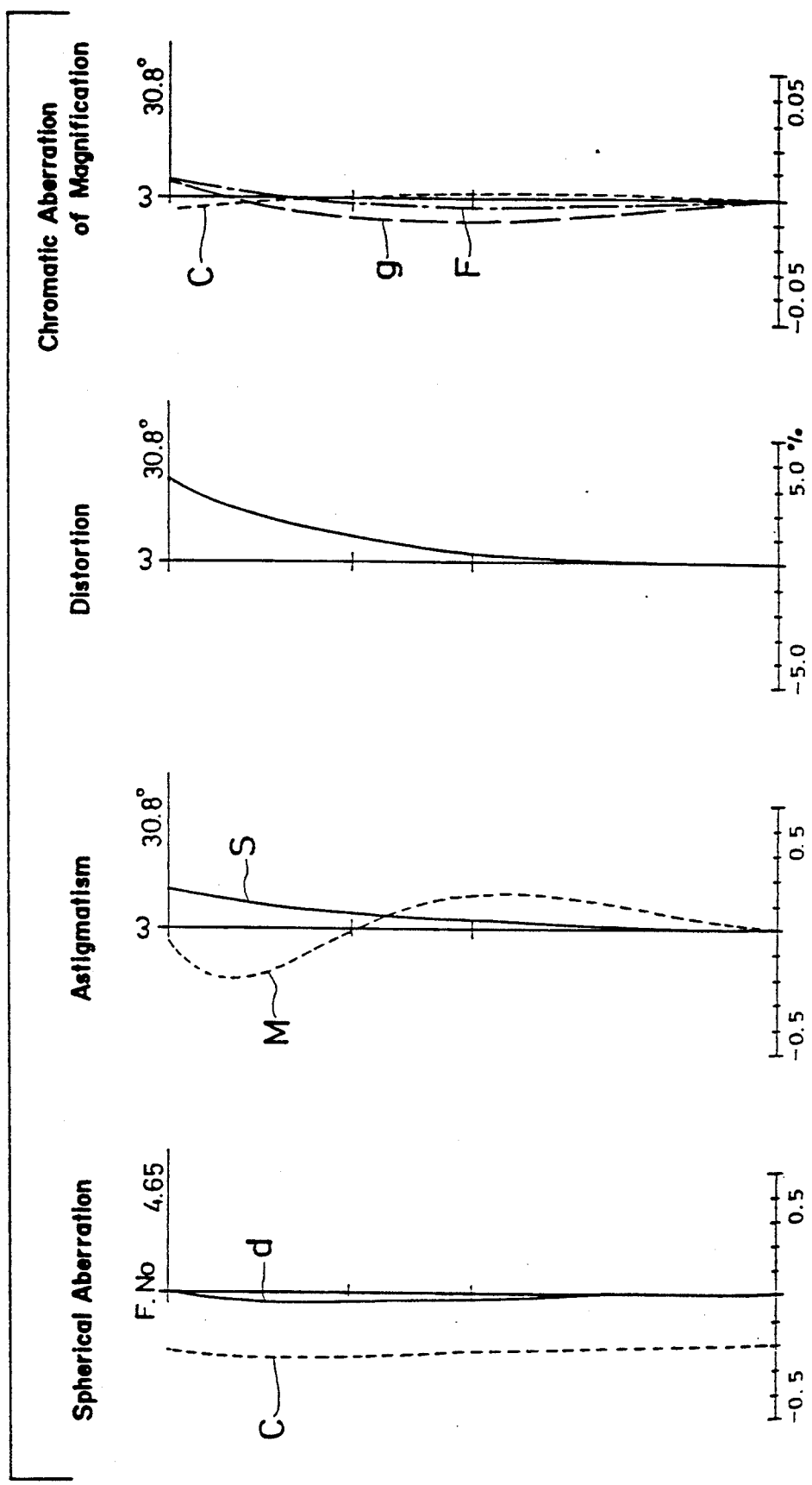
FIGS. 12 to 14 are curves illustrating aberration characteristics at the wide, standard and tele positions of Embodiment 3, respectively.
Figure 13:
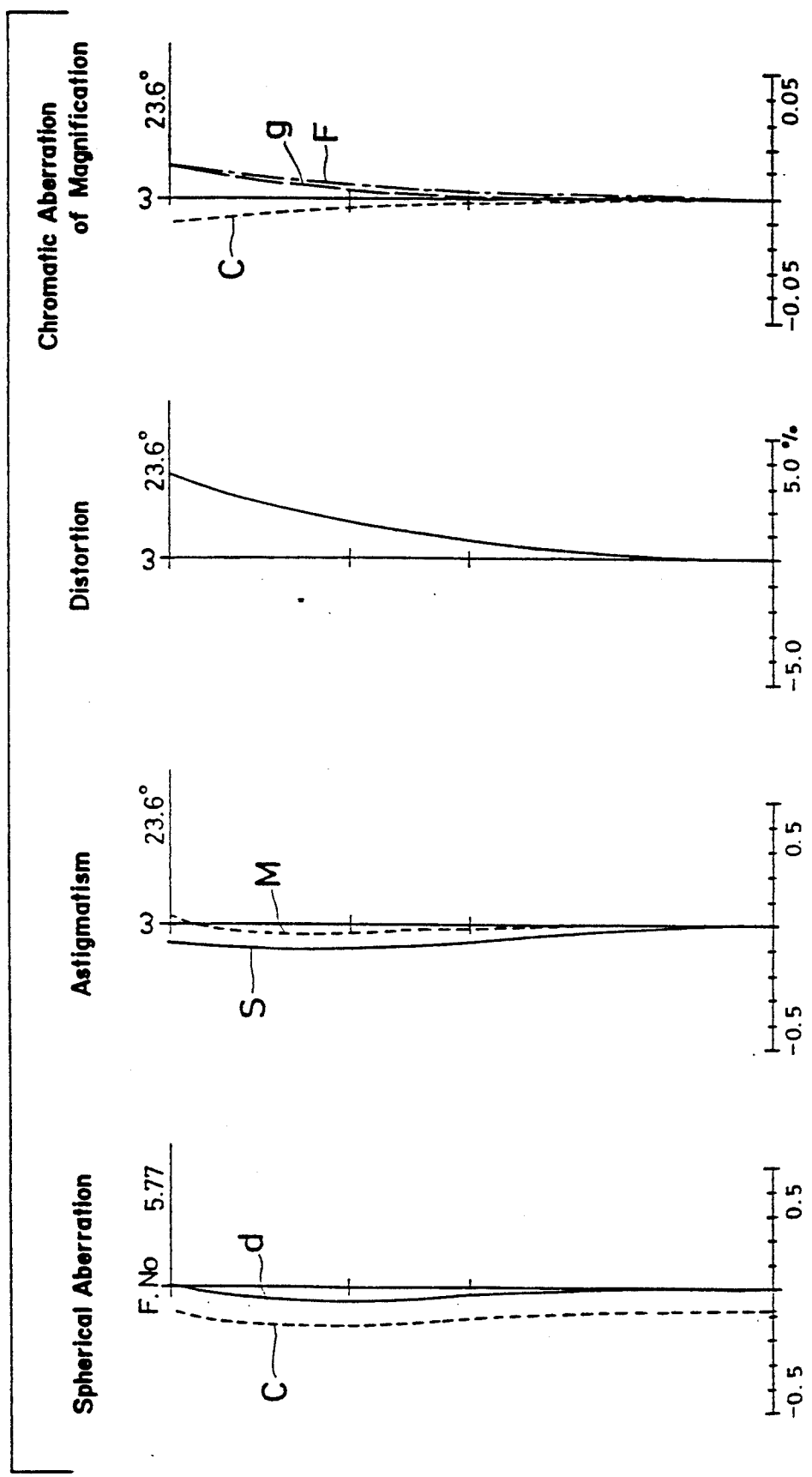
Figure 14:
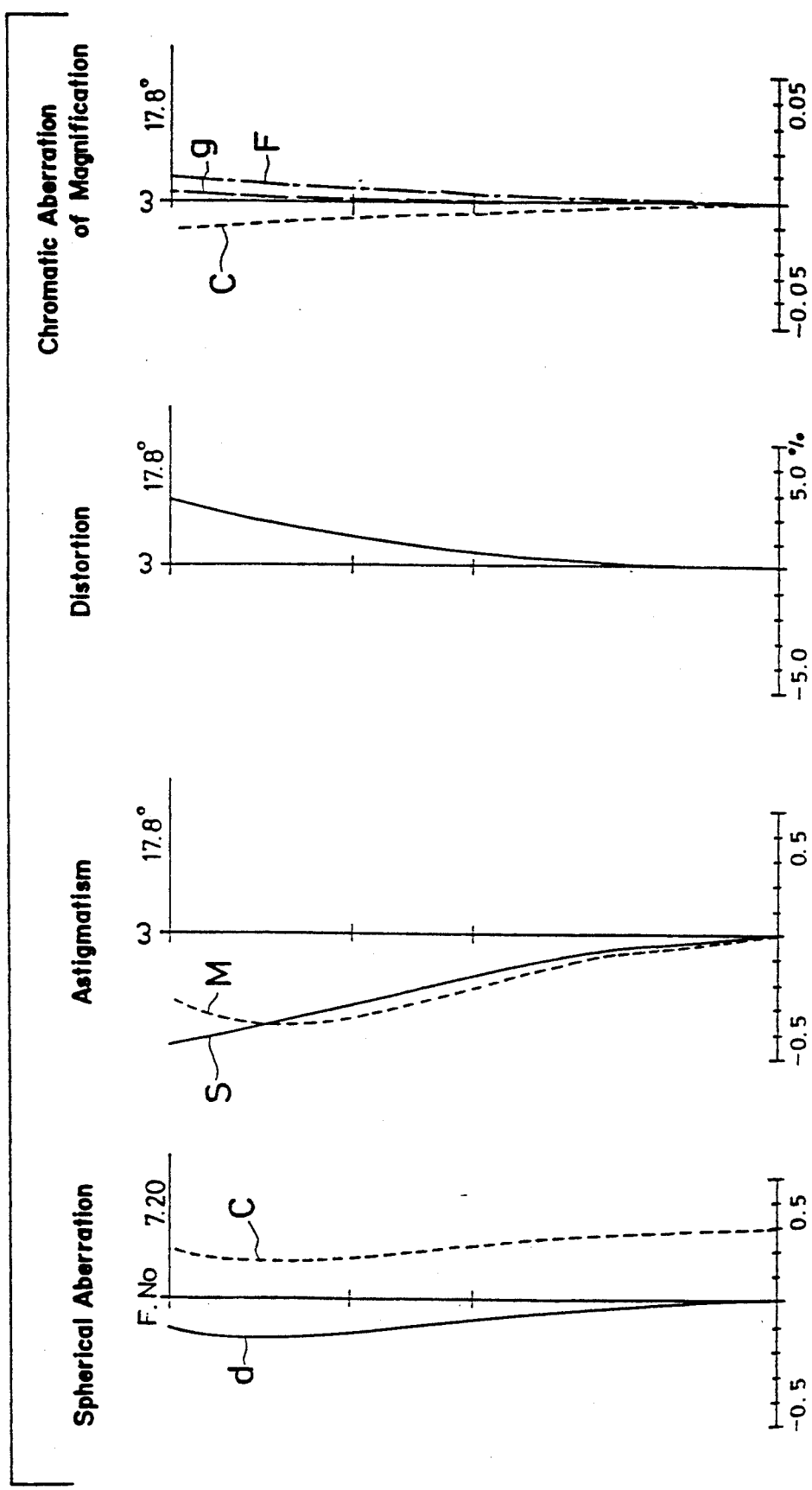

Aspheric Coefficients
The 11th Surface
$A_4 = 0.85604 \times 10^{-4}$,
$A_6 = -0.40008 \times 10^{-6}$,
$A_8 = 0.12902 \times 10^{-7}$
The 12th Surface
$A_4 = 0.84765 \times 10^{-4}$,
$A_6 = 0.20580 \times 10^{-7}$,
$A_8 = 0.95184 \times 10^{-9}$ $|f_3/f_W| = 0.64$ $\beta_{3W} = 1.47$ $f_2/f_W = 0.79$ $n_{2P}{}^* = 1.51$ The sectional views of the variable focal length lens system of Embodiment 3 at the wide and tele positions are shown in FIG. 3 and its aberration curves at the wide, standard and tele positions are shown in FIGS. 12 to 14.

EMBODIMENT 4

```
f  = 36.22 - 49.46 - 67.55
F_NO = 4.7 - 5.8 - 7.3
2ω = 61.6° - 47.2° - 35.5°
f_B = 8.89 - 19.48 - 33.94
d_4 = 4.000 - 7.509 - 10.090
d_11 = 13.926 - 8.705 - 4.476
```

| | | | |
|---|---|---|---|
| $r_1 = 12.7530$ | | | |
| | $d_1 = 1.2000$ | $n_{d1} = 1.80518$ | $\nu_{d1} = 25.43$ |
| $r_2 = 10.0260$ | | | |
| | $d_2 = 0.5000$ | | |
| $r_3 = 9.9700$ | | | |
| | $d_3 = 3.9500$ | $n_{d2} = 1.48749$ | $\nu_{d2} = 70.20$ |
| $r_4 = 30.3590$ | | | |
| | $d_4 = $ (variable) | | |
| $r_5 = \infty$ (stop) | | | |
| | $d_5 = 2.1000$ | | |
| $r_6 = -9.1440$ | | | |
| | $d_6 = 1.0000$ | $n_{d3} = 1.77250$ | $\nu_{d3} = 49.66$ |
| $r_7 = -14.2570$ | | | |

-continued

| | | | |
|---|---|---|---|
| $r_8 = -16.6640$ | $d_7 = 0.2000$ | | |
| $r_9 = -12.0010$ (aspheric) | $d_8 = 2.3000$ | $n_{d4} = 1.62230$ | $v_{d4} = 53.20$ |
| $r_{10} = -496.5460$ | $d_9 = 0.2000$ | | |
| $r_{11} = -15.1100$ | $d_{10} = 2.2500$ | $n_{d5} = 1.51633$ | $v_{d5} = 64.15$ |
| $r_{12} = -16.5080$ (aspheric) | $d_{11} =$ (variable) | | |
| $r_{13} = -464.6540$ | $d_{12} = 2.0000$ | $n_{d6} = 1.65160$ | $v_{d6} = 58.52$ |

Figure 4:
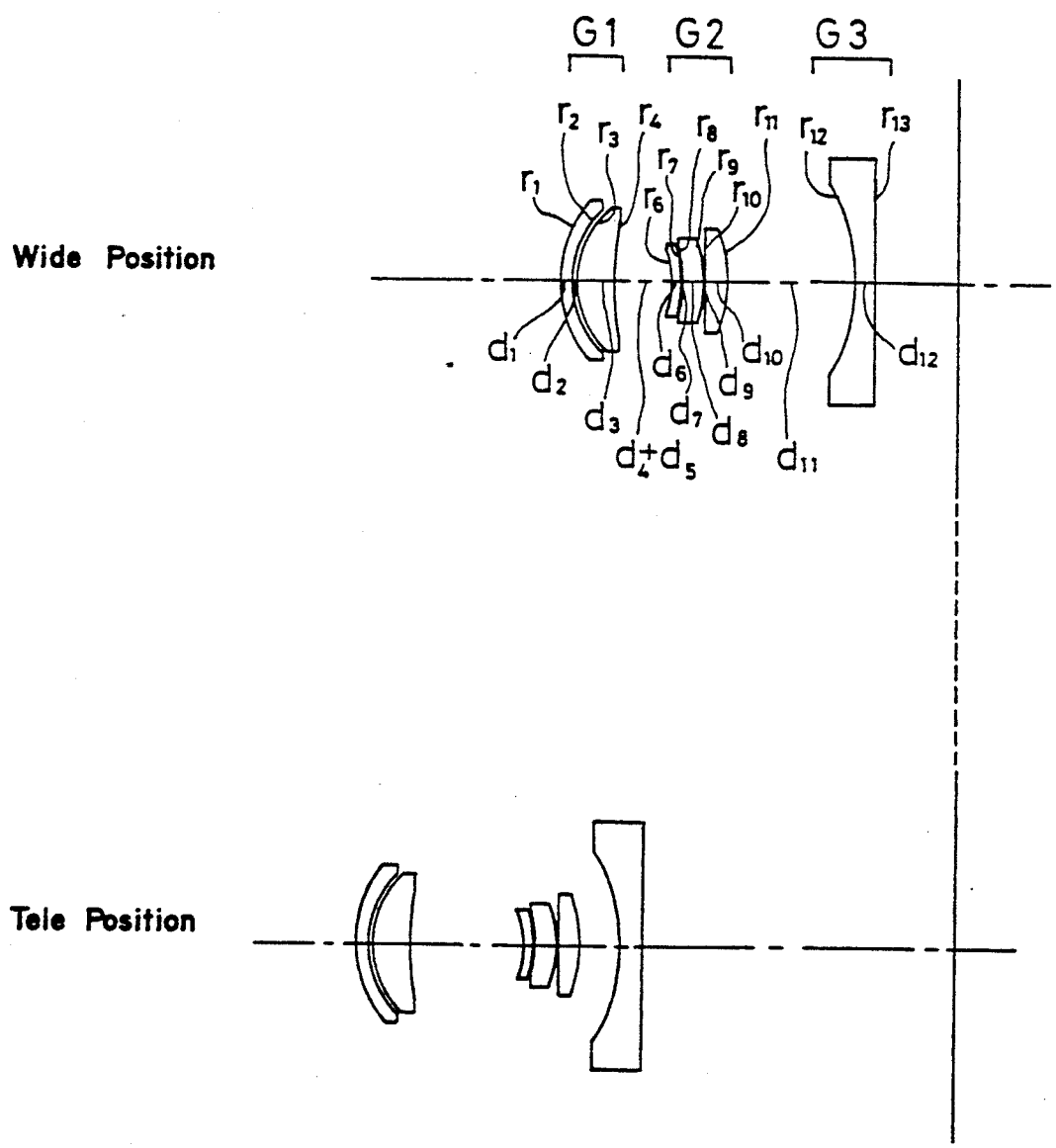
Figure 15:
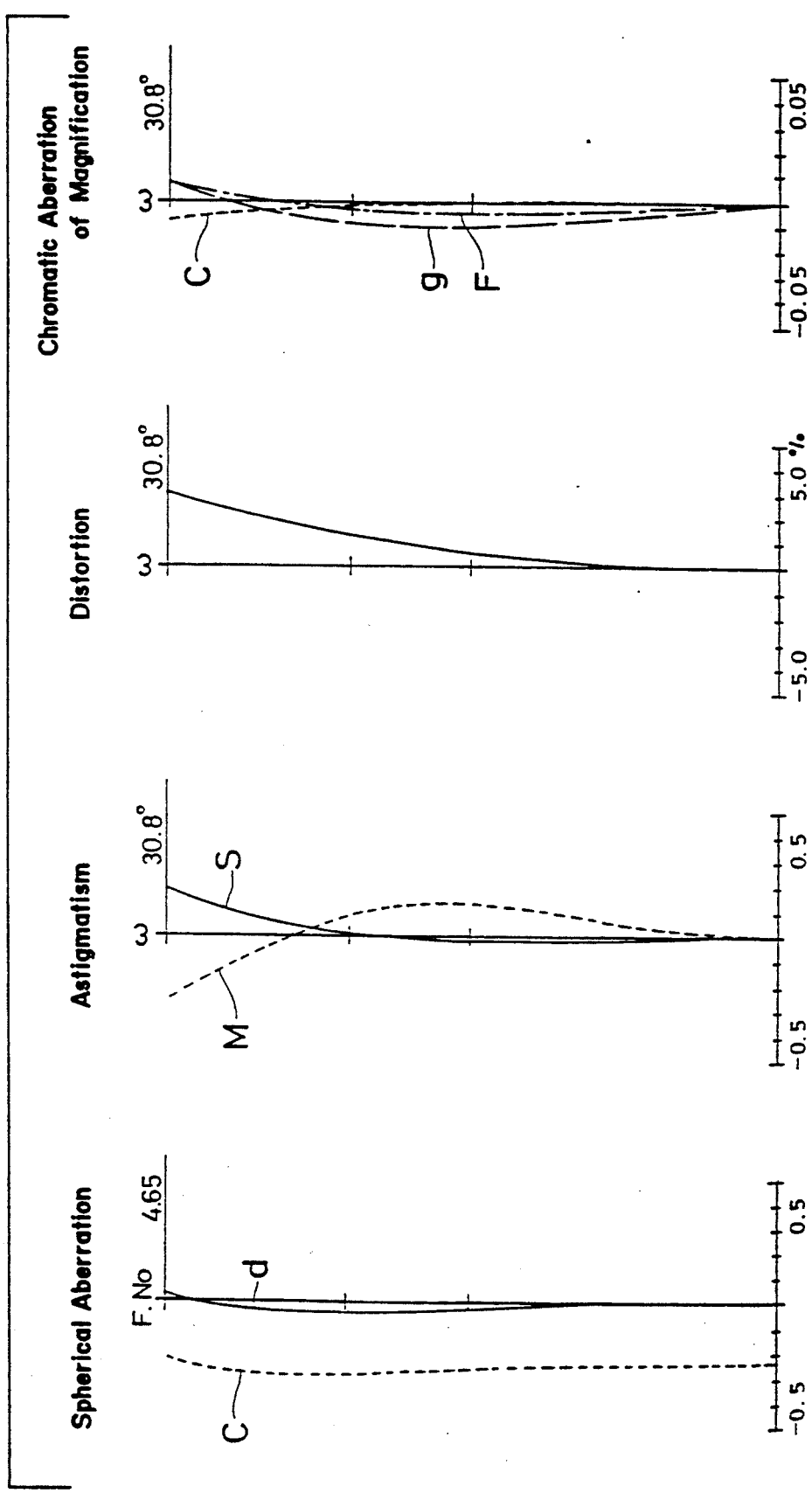
FIGS. 15 to 17 are curves illustrating aberration characteristics at the wide, standard and tele positions of Embodiment 4, respectively.
Figure 16:
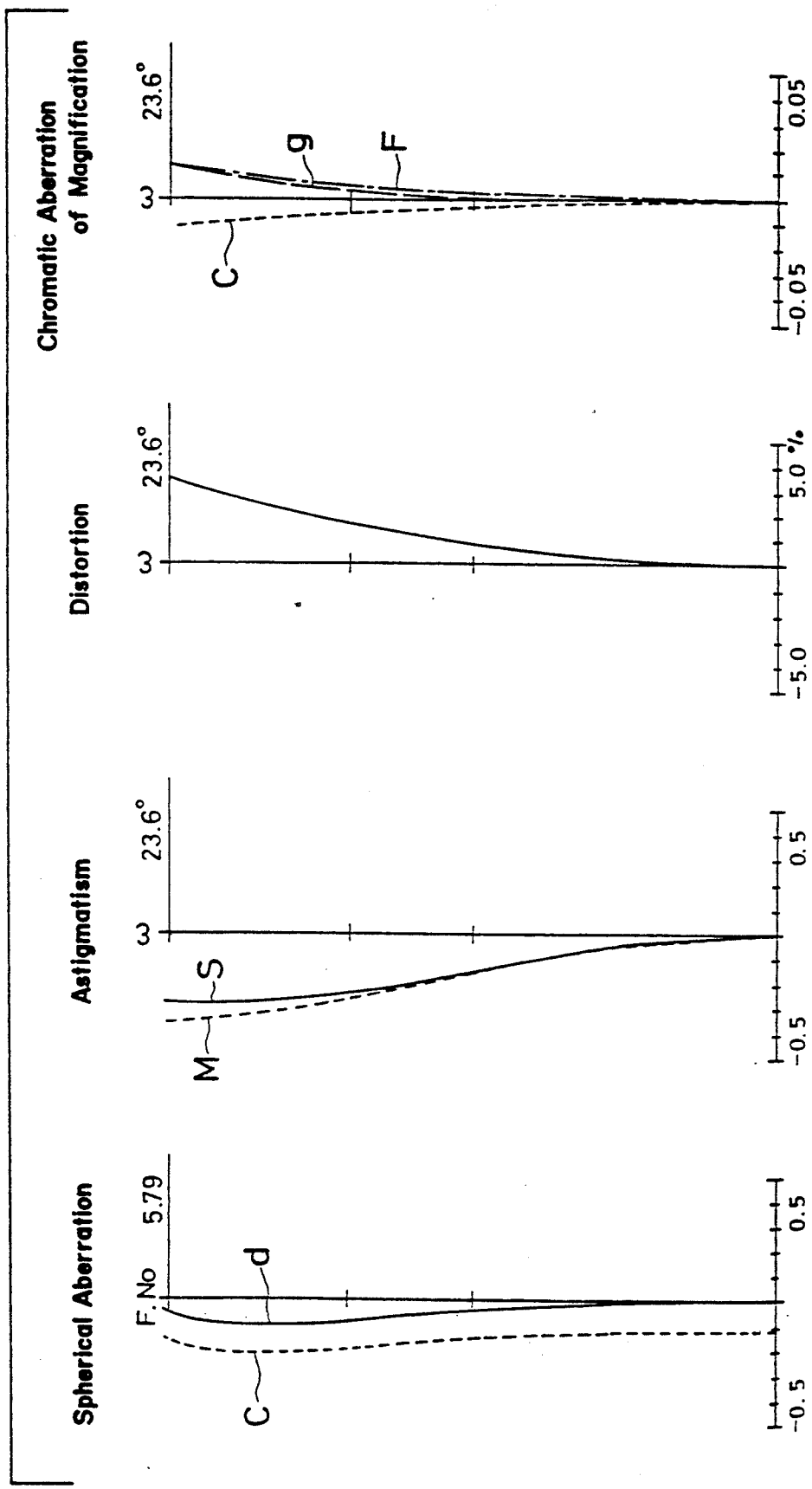
Figure 17:
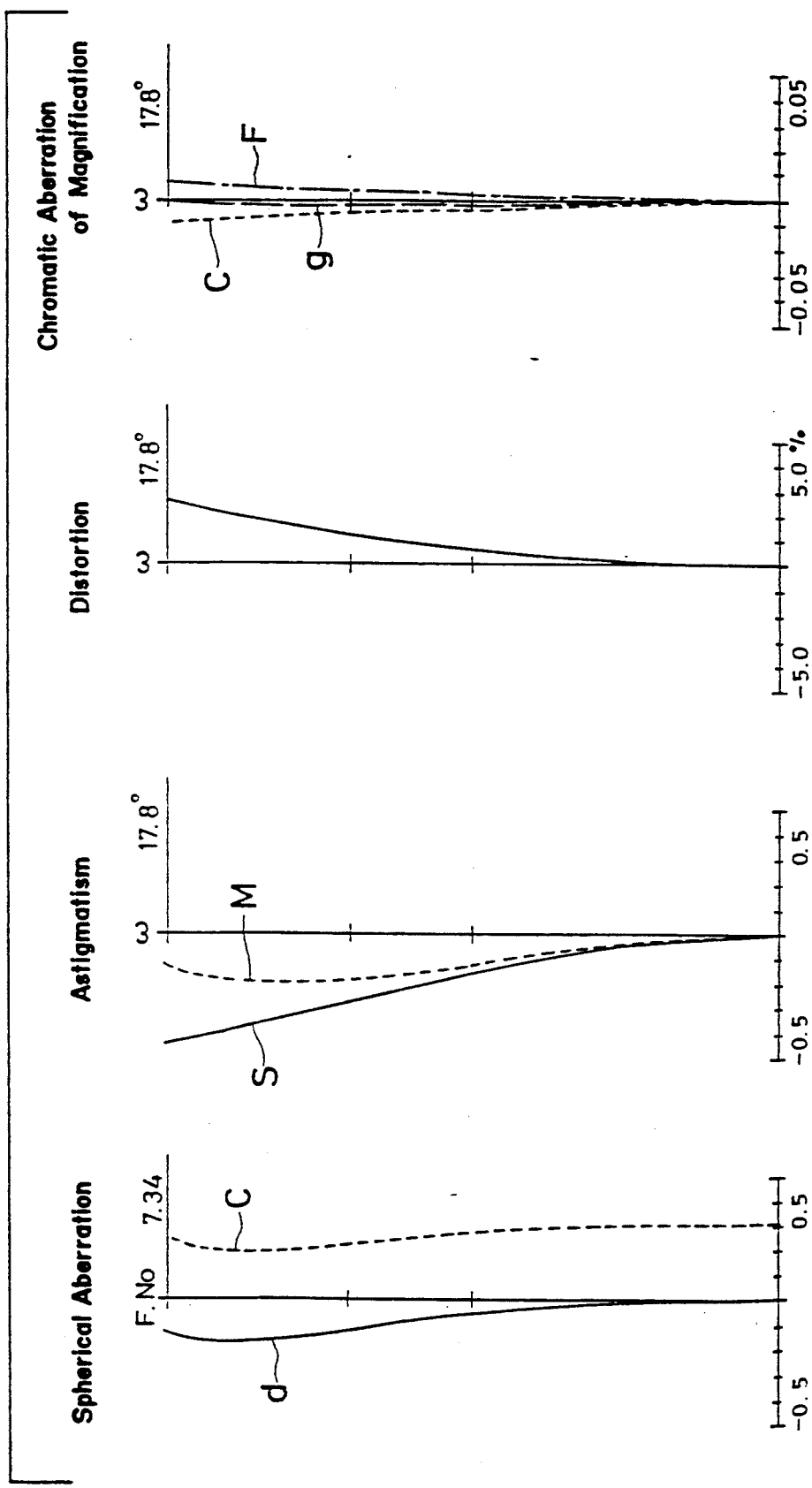

Aspheric Coefficients
The 9th Surface
$A_4 = 0.67467 \times 10^{-4}$,
$A_6 = -0.68792 \times 10^{-6}$,
$A_8 = 0.42566 \times 10^{-7}$
The 12th Surface
$A_4 = 0.45117 \times 10^{-4}$,
$A_6 = -0.15090 \times 10^{-7}$,
$A_8 = 0.50234 \times 10^{-9}$ $|f_3/f_W| = 0.73$ $\beta_{3W} = 1.39$ $f_2/f_W = 0.89$ $n_{2P}^* = 1.57$ The sectional views of the variable focal length lens system of Embodiment 4 at the wide and tele positions are shown in FIG. 4 and its aberration curves at the wide, standard and tele positions are shown in FIGS. 15 to 17.

Figure 5:
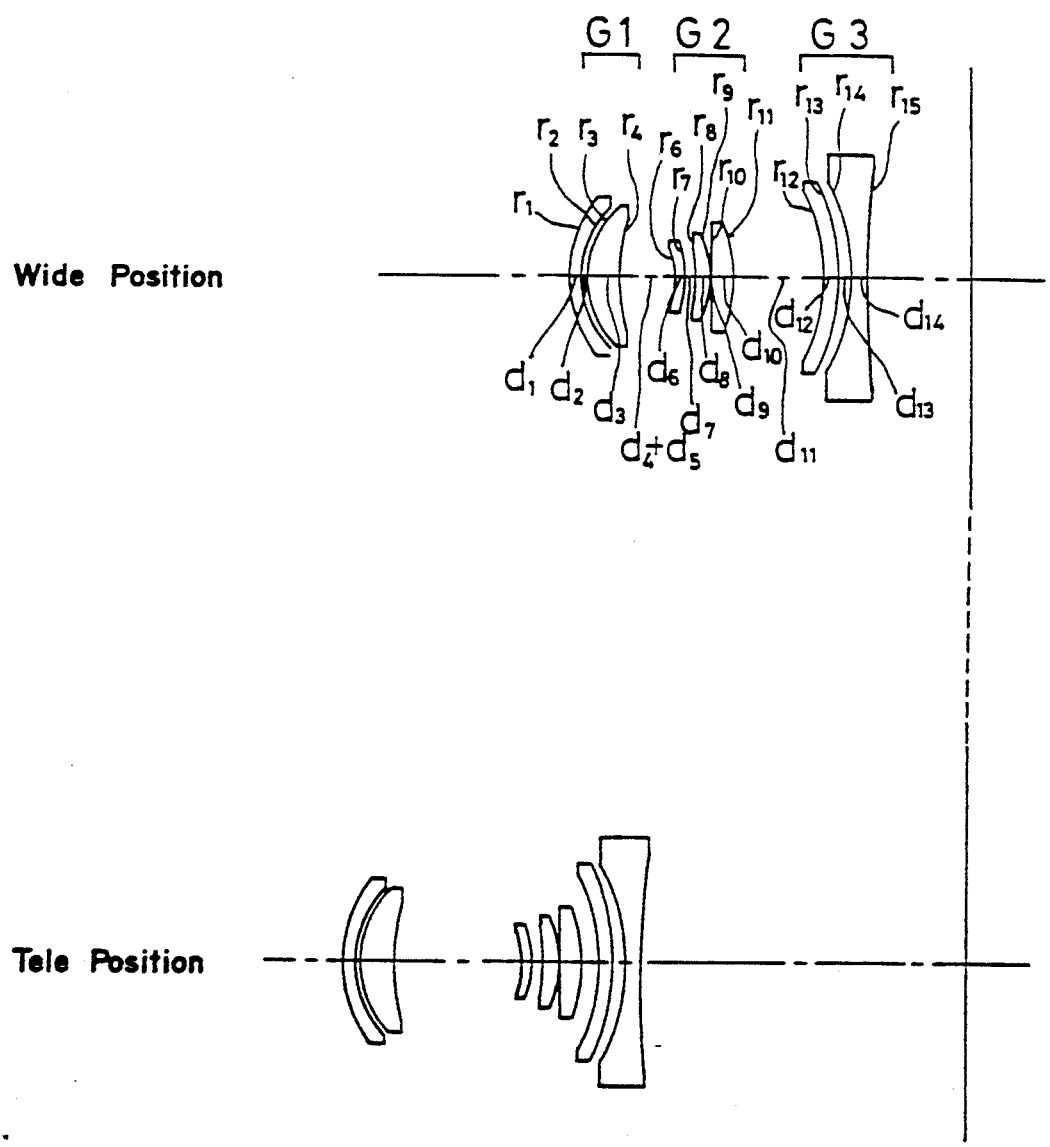
Figure 18:
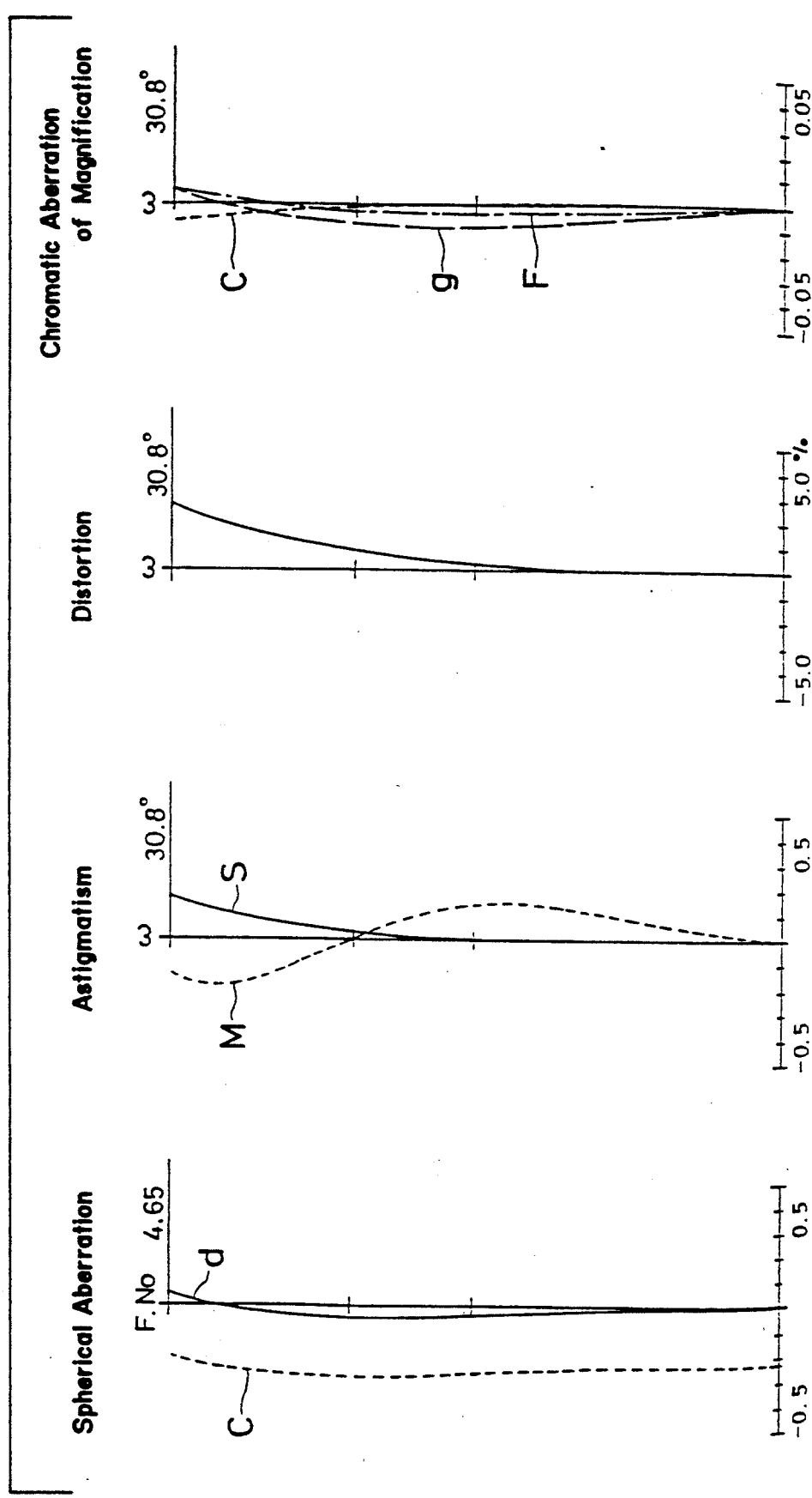
FIGS. 18 to 20 are curves illustrating aberration characteristics at the wide, standard and tele positions of Embodiment 5, respectively.
Figure 19:
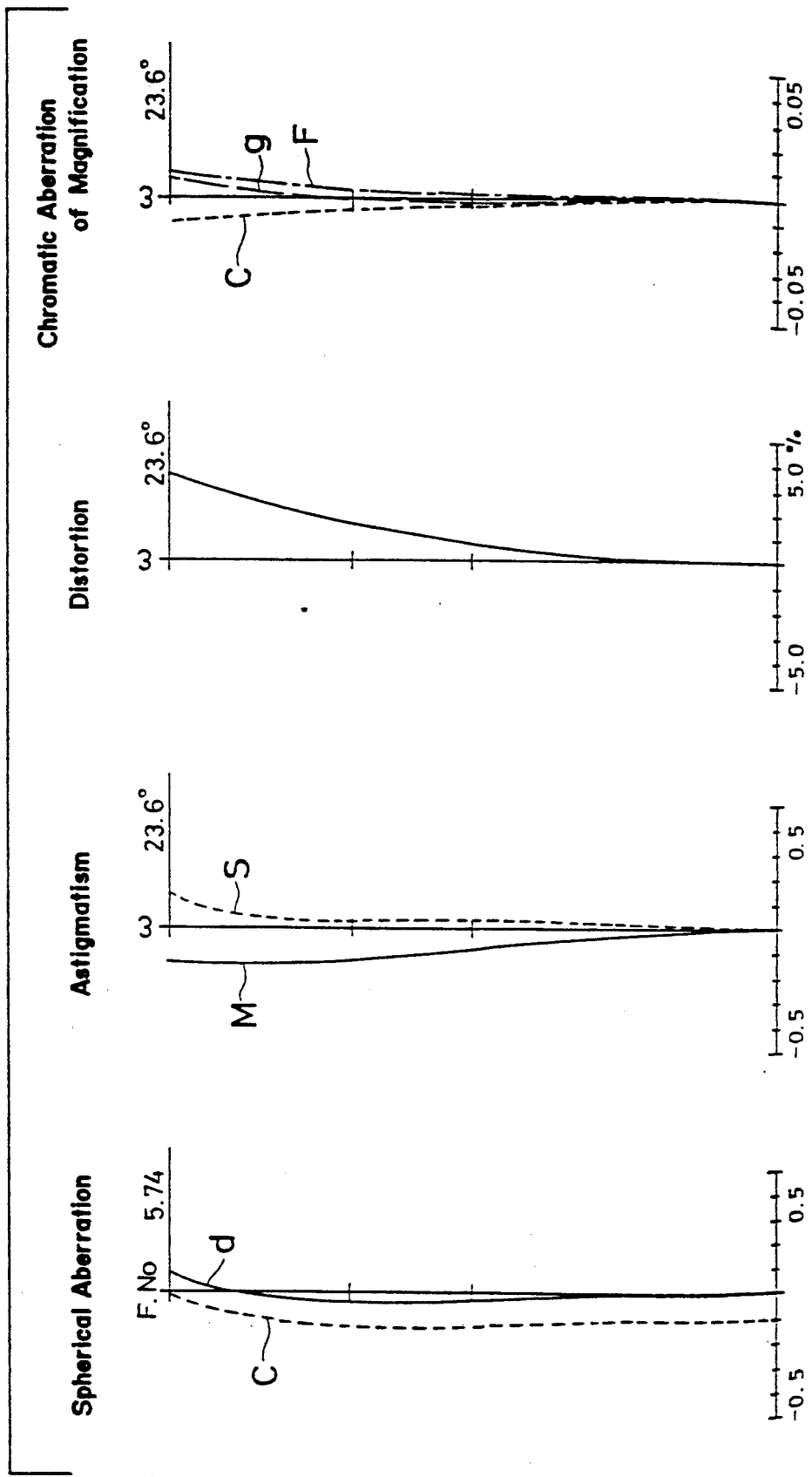
Figure 20:
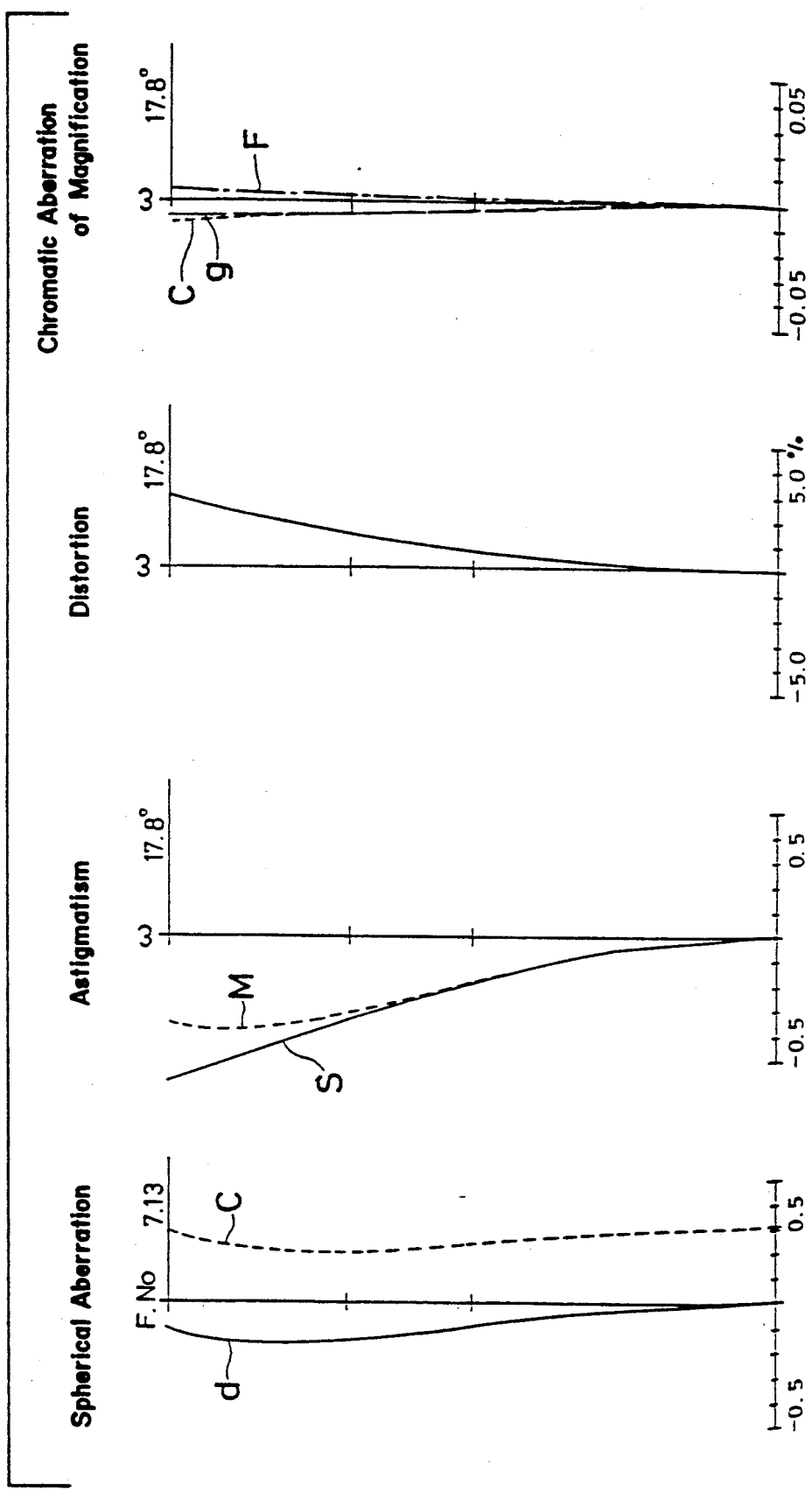

Aspheric Coefficients
The 11th Surface
$A_4 = 0.93664 \times 10^{-4}$,
$A_6 = -0.51245 \times 10^{-6}$,
$A_8 = 0.12176 \times 10^{-7}$
The 14th Surface
$A_4 = 0.90205 \times 10^{-4}$,
$A_6 = 0.17243 \times 10^{-7}$,
$A_8 = 0.36974 \times 10^{-9}$ $|f_3/f_W| = 0.64$ $\beta_{3W} = 1.52$ $f_2/f_W = 0.77$ $n_{2P}^* = 1.49$ The sectional views of the variable focal length lens system of Embodiment 5 at the wide and tele positions are shown in FIG. 5 and its aberration curves at the wide, standard and tele positions are shown in FIGS. 18 to 20.

EMBODIMENT 5

| | | | |
|---|---|---|---|
| $f = 36.22 - 49.46 - 67.55$ | | | |
| $F_{NO} = 4.7 - 5.8 - 7.1$ | | | |
| $2\omega = 61.6° - 47.2° - 35.5°$ | | | |
| $f_B = 10.35 - 20.10 - 32.98$ | | | |
| $d_4 = 3.467 - 7.609 - 11.065$ | | | |
| $d_{11} = 9.543 - 5.401 - 1.945$ | | | |
| $r_1 = 12.8050$ | | | |
| | $d_1 = 1.2000$ | $n_{d1} = 1.80518$ | $v_{d1} = 25.43$ |
| $r_2 = 10.1800$ | | | |
| | $d_2 = 0.5000$ | | |
| $r_3 = 10.1500$ | | | |
| | $d_3 = 3.6200$ | $n_{d2} = 1.48749$ | $v_{d2} = 70.20$ |
| $r_4 = 28.6380$ | | | |
| | $d_4 =$ (variable) | | |
| $r_5 = \infty$ (stop) | | | |
| | $d_5 = 2.1000$ | | |
| $r_6 = -8.0940$ | | | |
| | $d_6 = 1.0000$ | $n_{d3} = 1.78590$ | $v_{d3} = 44.18$ |
| $r_7 = -10.8150$ | | | |
| | $d_7 = 1.1200$ | | |
| $r_8 = -25.0500$ | | | |
| | $d_8 = 1.6000$ | $n_{d4} = 1.48749$ | $v_{d4} = 70.20$ |
| $r_9 = -12.0810$ | | | |
| | $d_9 = 0.2000$ | | |
| $r_{10} = -93.7490$ | | | |
| | $d_{10} = 2.2100$ | $n_{d5} = 1.50137$ | $v_{d5} = 56.40$ |
| $r_{11} = -14.7450$ (aspheric) | | | |
| | $d_{11} =$ (variable) | | |
| $r_{12} = -17.6910$ | | | |
| | $d_{12} = 1.4000$ | $n_{d6} = 1.48749$ | $v_{d6} = 70.20$ |
| $r_{13} = -22.0270$ | | | |
| | $d_{13} = 1.3460$ | | |
| $r_{14} = -15.6350$ (aspheric) | | | |
| | $d_{14} = 1.7000$ | $n_{d7} = 1.51633$ | $v_{d7} = 64.15$ |
| $r_{15} = 131.8870$ | | | |

What is claimed is:

1. A variable focal length lens system comprising, in the order from the object side, a first positive lens unit, a second positive lens unit and a third negative lens unit, the focal length being variable from the wide angle position to the tele position by moving the first positive lens unit and the third negative lens unit toward the object side while moving the second positive lens unit toward the object side at a lower speed than the first and third lens units, the second positive lens unit consisting of, in the order from the object side, a negative lens component, a first positive lens component and a second positive lens component, the lens system satisfying the following conditions:

$$0.5 < |f_3/f_W| < 0.9 \quad (1)$$

$$1.3 < \beta_{3W} < 2.0 \quad (2)$$

$$0.5 < f_2/f_W < 1.3 \quad (3)$$

where $f_W$ is the focal length of the entire system at the wide position, $f_2$ and $f_3$ are the focal lengths of the second and third lens units, respectively, and $\beta_{3W}$ is the image magnification of the third lens unit at the wide position.

2. The lens system of claim 1, wherein the first positive lens unit comprises a negative meniscus lens component with its convex surface on the object side and a positive meniscus lens component with its convex surface on the object side; and the third negative lens unit comprises at least one negative lens component.

3. The lens system of claim 2, wherein each of the second positive lens unit and the third negative lens unit comprises at least one aspheric surface.

4. The lens system of claim 3, wherein the aspheric surface included in the second positive lens unit has a shape in which positive power gradually decreases or negative power gradually increases as the distance from the optical axis becomes larger.

5. The lens system of claim 3, wherein the aspheric surface included in the third negative lens unit has a shape in which positive power gradually increases or negative power gradually decreases as the distance from the optical axis becomes larger.

6. The lens system of claim 3, wherein the mean value of the refractive indices of the positive lens components included in the second positive lens unit, $n_{2P}*$, satisfies the following condition:

$$n_{2P}* < 1.65 \quad (4)$$

7. The lens system of claim 3, wherein the third negative lens unit comprises a positive lens component and a negative lens component, and the image-side surface of said second positive lens component and the image-side surface of the positive lens component of the third negative lens unit are aspheric.

8. The lens system of claim 3, wherein the third negative lens unit comprises a positive lens component and a negative lens component, and the image-side surface of said second positive lens component and the object-side surface of the negative lens component of the third negative lens unit are aspheric.

9. The lens system of claim 3, wherein the third negative lens unit comprises a single negative lens component, and the image-side surface of said second positive lens component and the object-side surface of the negative lens component of the third negative lens unit are aspheric.

10. The lens system of claim 3, wherein the third negative lens unit comprises a single negative lens component, and the image-side surface of said first positive lens component and the object-side surface of the negative lens component of the third negative lens unit are aspheric.

11. A variable focal length lens system comprising, in the order from the object side, a first positive lens unit comprising a positive cemented lens component with a convex surface on the object side; a second positive lens unit consisting of, in the order from the object side, a negative lens component with a concave surface on the object side, and two positive lens components; and a third negative lens unit comprising a positive lens component and a negative lens component; the focal length being variable from the wide position to the tele position by moving the first positive lens unit and the third negative lens unit toward the object side while moving the second positive lens unit toward the object side at a lower speed than the first and third lens units.

12. The lens system of claim 11, wherein the most image-side surface of the second lens unit and the image-side surface of the positive lens component of the third lens unit are aspheric.

13. The lens system of claim 11, wherein the most image-side surface of the second lens unit and the object-side surface of the negative lens component of the third lens unit are aspheric.

14. A variable focal length lens system comprising, in the order from the object side, a first positive lens unit comprising a negative lens component with a convex surface on the object side, and a positive lens component with a convex surface on the object side and separated from the negative lens component by an air space; a second positive lens unit consisting of, in the order from the object side, a negative lens component with a concave surface on the object side, the first and second positive lens components; and a third negative lens unit comprising a negative lens component; the focal length being variable from the wide position to the tele position by moving the first positive lens unit and the third negative lens unit toward the object side while moving the second position lens unit toward the object side at a lower speed than the first and third lens units.

15. The lens system of claim 14, wherein the most image-side surface of the second lens unit and the most object-side surface of the third lens unit are aspheric.

16. The lens system of claim 14, wherein the image-side surface of the first positive lens component of the second lens unit and the most object-side surface of the third lens unit are aspheric.

17. A variable focal length lens system comprising, in the order from the object side, a first positive lens unit comprising a negative lens component with a convex surface on the object side, and a positive lens component with a convex surface on the object side and separated from the negative lens component by an air space; a second positive lens unit consisting of, in the order from the object side, a negative lens component with a concave surface on the object side, and two positive lens components; and a third negative lens unit comprising a positive lens component and a negative lens component; the focal length being variable from the wide position to the tele position by moving the first positive lens unit and the third negative lens unit toward the object side while moving the second positive lens unit toward the object side at a lower speed than the first and third lens units.

18. The lens system of claim 17, wherein the most image-side surface of the second lens unit and the object-side surface of the negative lens component of the third lens unit are aspheric.

19. The lens system of one of claim 11 to 18, wherein a stop is arranged between the first positive lens unit and the second positive lens unit.

* * * * *